(12) United States Patent
Linzer

(10) Patent No.: US 8,717,462 B1
(45) Date of Patent: May 6, 2014

(54) CAMERA WITH COLOR CORRECTION AFTER LUMINANCE AND CHROMINANCE SEPARATION

(71) Applicant: Ambarella, Inc., Santa Clara, CA (US)

(72) Inventor: Elliot N. Linzer, Bergenfield, NJ (US)

(73) Assignee: Ambarella, Inc., Santa Clara, CA (US)

( * ) Notice: Subject to any disclaimer, the term of this patent is extended or adjusted under 35 U.S.C. 154(b) by 0 days.

(21) Appl. No.: 13/949,575

(22) Filed: Jul. 24, 2013

Related U.S. Application Data

(63) Continuation of application No. 12/727,517, filed on Mar. 19, 2010, now Pat. No. 8,508,624.

(51) Int. Cl.
*H04N 9/68* (2006.01)
(52) U.S. Cl.
USPC ............................ 348/234; 348/241; 348/272
(58) Field of Classification Search
USPC ......................................... 348/234, 241, 272
See application file for complete search history.

(56) References Cited

U.S. PATENT DOCUMENTS

| | | | |
|---|---|---|---|
| 4,275,413 A | 6/1981 | Sakamoto et al. | 358/80 |
| 7,536,487 B1 | 5/2009 | Kohn | 345/503 |
| 2007/0091213 A1* | 4/2007 | Jaspers | 348/687 |
| 2007/0132865 A1* | 6/2007 | Adams et al. | 348/242 |
| 2009/0285480 A1 | 11/2009 | Bennett et al. | 382/167 |
| 2010/0104180 A1 | 4/2010 | Chiang | 382/167 |

OTHER PUBLICATIONS

"MT9T001 3-Megapixel Digital Image Sensor—1/2-Inch 3-Megapixel CMOS Active-Pixel Digital Image Sensor", 2003 Micron Technology Inc., pp. 1-37.
"Digital Negative (DNG) Specification", Version 1.3.0.0, Adobe Systems Incorporated, Jun. 2009, pp. 1-89.

* cited by examiner

*Primary Examiner* — Anthony J Daniels
(74) *Attorney, Agent, or Firm* — Christopher P. Maiorana, PC

(57) ABSTRACT

An apparatus having a circuit is disclosed. The circuit may be configured to (i) receive a digital image from an electro-optical sensor, (ii) convert the digital image from a red-green-blue representation to a luminance-and-chrominance representation, (iii) generate a reduced noise representation of the digital image by reducing noise in the luminance-and-chrominance representation and (iv) generate a color corrected representation of the digital image by color correcting the reduced noise representation.

18 Claims, 7 Drawing Sheets

US 8,717,462 B1

CAMERA WITH COLOR CORRECTION AFTER LUMINANCE AND CHROMINANCE SEPARATION

CROSS REFERENCE TO RELATED APPLICATIONS

This application relates to U.S. Ser. No. 12/727,517, filed Mar. 19, 2010, which is related to co-pending U.S. application Ser. No. 12/706,816 filed Feb. 17, 2010, and Ser. No. 12/712,307 filed Feb. 25, 2010, and U.S. Pat. No. 7,536,487, which are hereby incorporated by reference in their entirety.

FIELD OF THE INVENTION

The present invention relates to a method and/or architecture for digital cameras generally and, more particularly, to a camera with color correction after luminance and chrominance separation.

BACKGROUND OF THE INVENTION

A conventional camera sensor employs filters that pass through red, green, and blue light to different pixels on a sensor. The color measured on the sensor (Bayer values) is not the final color representation used in the picture, as a conventional camera will have the following steps: (i) black level subtraction, (ii) white balance, (iii) demosaic (generating RGB triples for each pixel from the sensor Bayer Color Filter Array (CFA) pattern), (iv) color correction (i.e., a three-dimensional mapping from an input RGB color space to an output RGB color space), (v) tone curve (mapping the color from a linear camera space to a nonlinear output space—linear means that the amount of light represented by a sample is directly in proportion to a corresponding digital value) and (vi) conversion from RGB to YUV.

Color correction is commonly used in digital cameras because a spectral response of the camera photo-receptors does not match a desired response in an output color space. The color correction is used to produce a picture that has accurate and aesthetically pleasing colors. Unfortunately, the amplitude of noise, especially in some colors, can be greatly increased by the color correction.

Several conventional color correction methods are currently available. Some methods use a matrix (M) multiplication to calculate an RGB output vector from a red, green, blue (RGB) input vector, such as:

$R\_out = M11 \times R\_in + M12 \times G\_in + M13 \times B\_in$ $G\_out = M21 \times R\_in + M22 \times G\_in + M23 \times B\_in$ $B\_out = M31 \times R\_in + M32 \times G\_in + M33 \times B\_in$ For example, the Adobe "Digital Negative (DNG) Specifications" file format specifies color correction by means of a matrix. Other conventional color correction methods use a three-dimensional lookup table, with interpolation between the table entries. For example, U.S. Pat. No. 4,275,413 describes a method for tetrahedral interpolation.

Referring to FIG. 1, a block diagram of a conventional camera color processing pipeline 20 is shown. Noise reduction is conventionally done at a few of many different points in the pipeline 20. FIG. 1 shown the six color processing steps mentioned above plus a YUV to YUV color correction step, a compression step and several noise reduction steps. A typical camera performs noise reduction only in some of the places illustrated.

Different tradeoffs exist between implementing the noise reduction at different points in the pipeline 20. From a cost point of view, noise reduction is less expensive to implement: (i) before demosaicing as opposed to after demosaicing, (ii) after tone correction as opposed to before tone correction and (iii) after conversion to YUV as opposed to just before conversion to YUV. After demosaicing the data rate is tripled. After tone correction fewer bits per sample typically exist. After conversion to YUV, especially if down-sampling to the 4:2:2 format or the 4:2:0 format is involved, the sample rate is often reduced.

From a quality point of view (better quality meaning more noise reduction with fewer or less-objectionable artifacts such as loss of sharpness and detail) filtering at different places has different advantages. For example, filtering early in the processing can be advantageous because noise has not yet spread between the samples or significantly changed. On the other hand, filtering after conversion to YUV can be advantageous because the type and amount of filtering suitable for chrominance data are different from the type and amount of filtering suitable for luminance data. Typically, the chrominance data is filtered more heavily than the luminance data.

Referring to FIG. 2, a diagram of an example signal amplitude before 22 and after 24 a conventional spatial noise filtering is shown. Noise reduction by spatial noise filtering distinguishes between signal variations that are due to noise versus signal variations that are due to changes in the underlying signal. Different conventional techniques judge (i) small signal variations as noise to be reduced or eliminated and (ii) large signal variations where the underlying signal is to be maintained.

Referring to FIG. 3, a diagram of an example signal amplitude before 26 and after 28 a conventional color correction is shown. Typically, the amplitude of an observed variation relative to the noise standard deviation is used to determine if the variation is due to noise or variation in the underlying signal. As described earlier, color correction can increase noise in some colors. In the diagram, some noise 30 is not increased by the color correction while other noise 32 is increased.

Due to the color-dependent noise amplification, a determination or even approximation of the noise standard deviation after color correction can be difficult or expensive, especially if the color correction process is complex. Therefore, the quality of any noise reduction after color correction is usually degraded, for example, noise reduction done after conversion to YUV. Noise reduction done in YUV may be appropriate for the reasons described above (i.e., cost and ability to control type and amount of filtering for chrominance independent of luminance). However, the effectiveness of such noise reductions can be degraded by occurring after the color correction.

SUMMARY OF THE INVENTION

The present invention concerns an apparatus having a circuit. The circuit may be configured to (i) receive a digital image from an electro-optical sensor, (ii) convert the digital image from a red-green-blue representation to a luminance-and-chrominance representation, (iii) generate a reduced noise representation of the digital image by reducing noise in the luminance-and-chrominance representation and (iv) generate a color corrected representation of the digital image by color correcting the reduced noise representation.

The objects, features and advantages of the present invention include providing a camera with color correction after luminance and chrominance separation that may (i) perform color correction after a conversion to a YUV color space, (ii) provide luminance and chrominance noise reduction prior to the color correction, (iii) minimize color-dependent noise, and/or (iv) provide different noise filtering for luminance than for chrominance.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
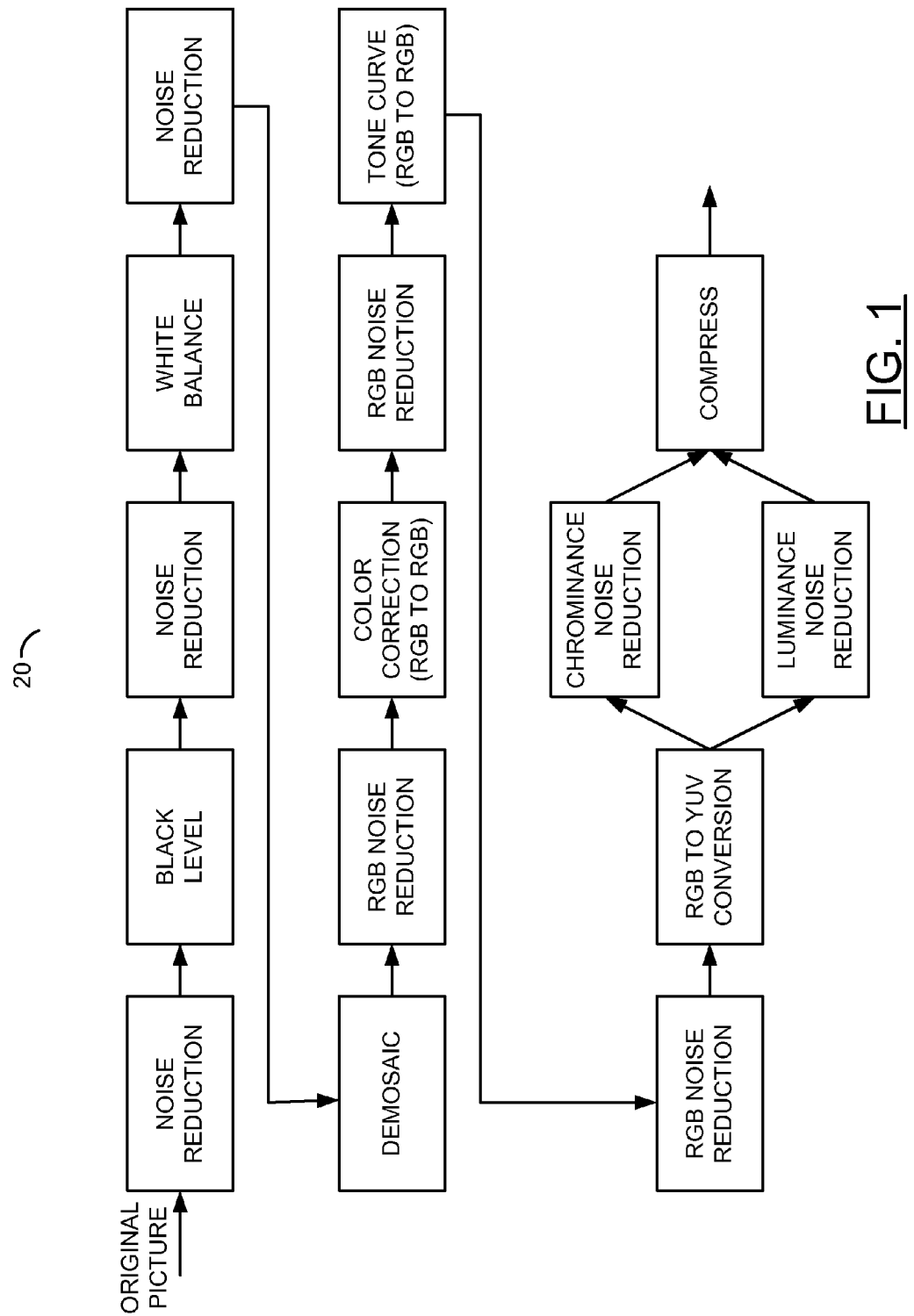
FIG. 1 is a block diagram of a conventional camera color processing pipeline.
Figure 2:
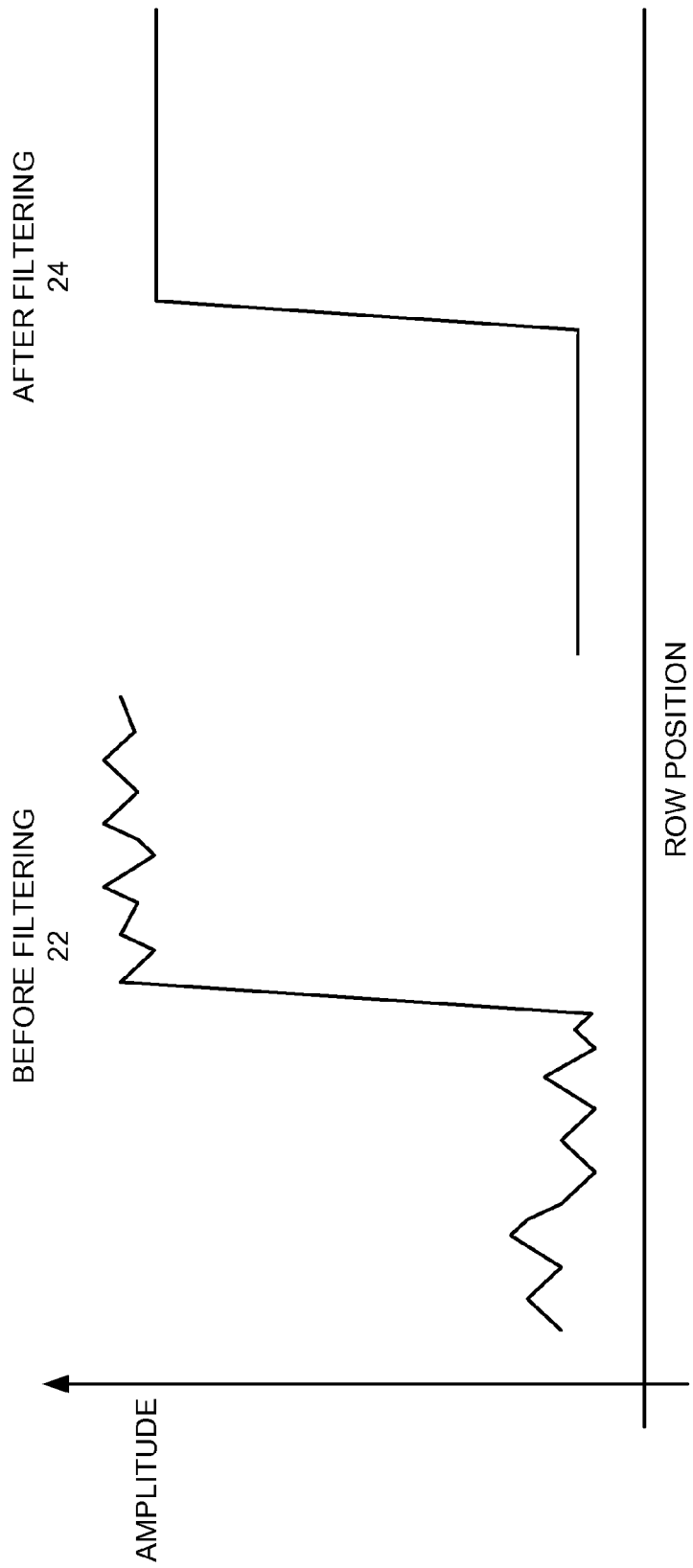
FIG. 2 is a diagram of an example signal amplitude before and after a conventional spatial noise filtering.
Figure 3:
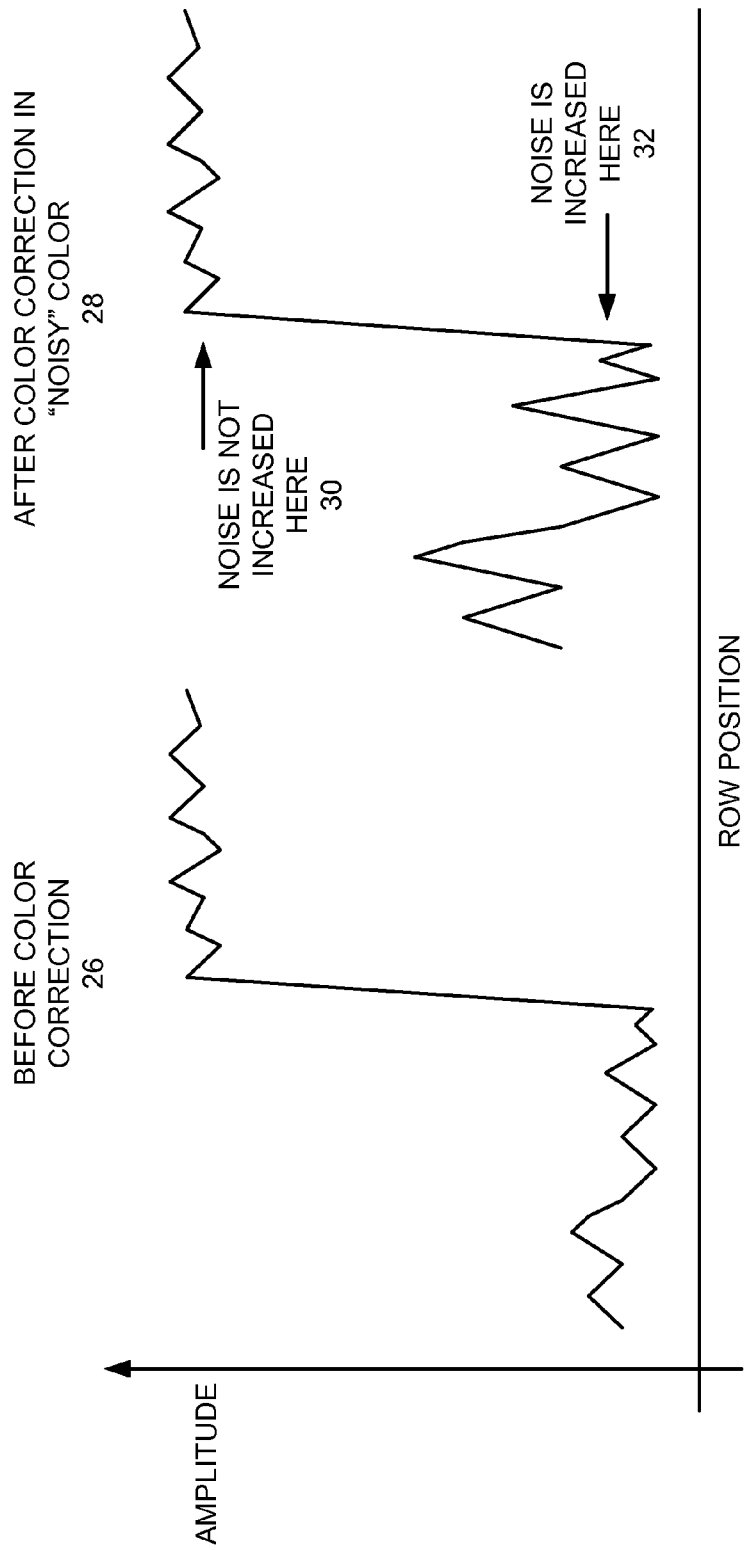
FIG. 3 is a diagram of an example signal amplitude before and after a conventional color correction.
Figure 4:
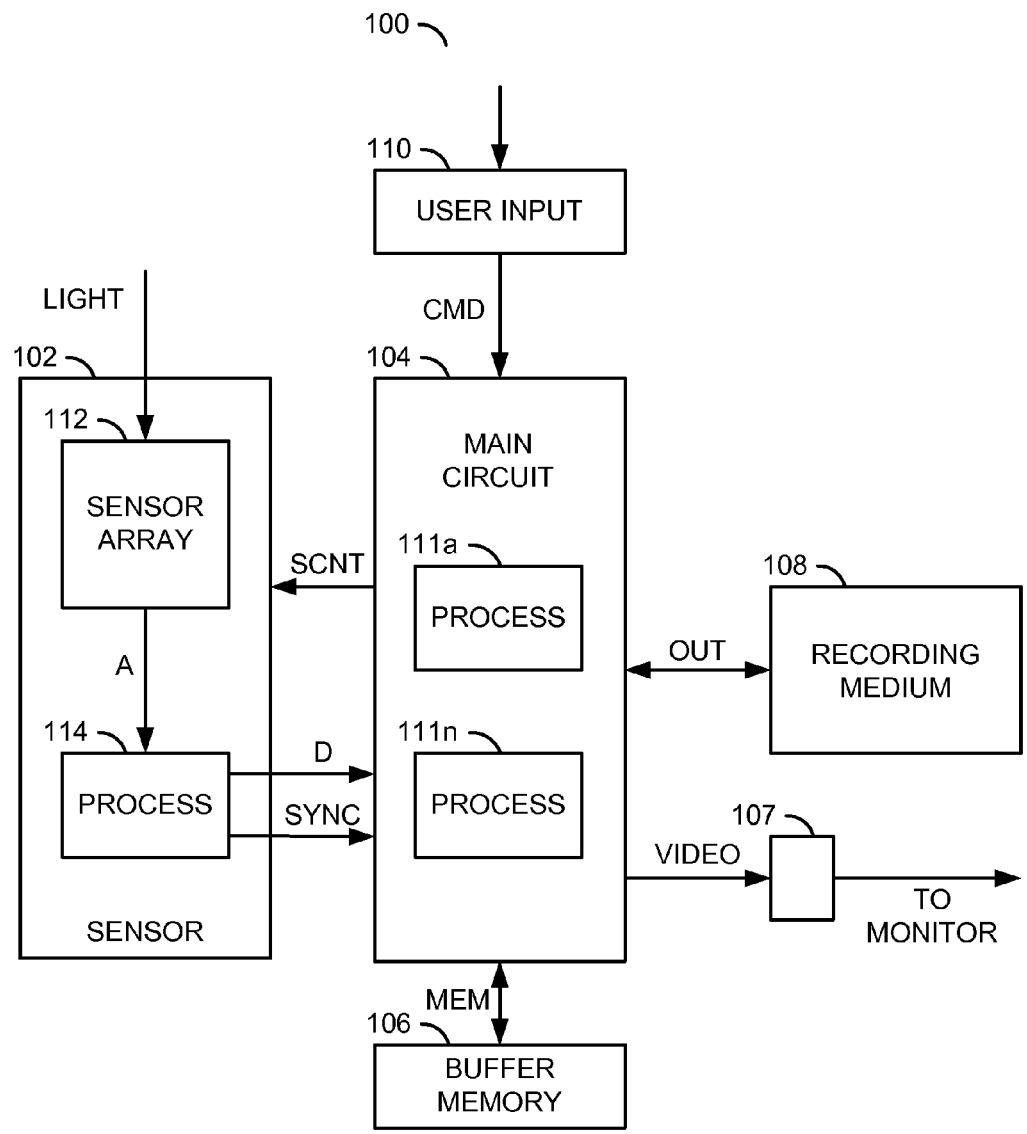
FIG. 4 is a block diagram of an example implementation of an apparatus.

Referring to FIG. 4, a block diagram of an example implementation of an apparatus 100 is shown. The apparatus (or system) 100 may form a digital still camera and/or camcorder. The apparatus 100 generally comprises a circuit (or module) 102, a circuit (or module) 104, a circuit (or module) 106, a circuit (or port) 107, a circuit (or module) 108 and a circuit (or module) 110. An optical signal (e.g., LIGHT) may be received by the circuit 102. The circuit 102 may generate and present a digital signal (e.g., D) to the circuit 104. A synchronization signal (e.g., SYNC) may also be generated by the circuit 102 and received by the circuit 104. A sensor control signal (e.g., SCNT) may be generated and presented from the circuit 104 to the circuit 102. A signal (e.g., OUT) may be exchanged between the circuit 104 and the circuit 108. The circuit 104 may generate and present a signal (e.g., VIDEO) through the interface 107 to a monitor outside the apparatus 100. A command signal (e.g., CMD) may be generated by the circuit 110 and presented to the circuit 104. A signal (e.g., MEM) may be exchanged between the circuit 104 and the circuit 106. The circuits 102 to 110 may be implemented in hardware, software, firmware or any combination thereof.

The circuit 102 may implement an electro-optical sensor circuit. The circuit 102 is generally operational to convert the optical image received in the signal LIGHT into the signal D based on parameters received in the signal SCNT. The signal D may convey the one or more optical images as one or more digital images (e.g., fields, frames, pictures). The signal SYNC generally conveys synchronization information related to the images and the pixels within. The signal SCNT may carry windowing, binning, read rate, offset, scaling, color correction and other configuration information for use by the circuit 102. The images may be generated having an initial resolution and an initial color space (e.g., a Bayer color space) at an initial data rate. In some embodiments, the circuit 102 may include an image pipeline or other image source that supplies source images in the signal D.

The circuit 104 may implement a main circuit. The circuit 104 is generally operational to generate the signal OUT by processing the images received in the signal D. The circuit 104 may be operational to generate the signal SCNT based on the user selections received through the signal CMD. The circuit 104 may load and store data to the circuit 106 through the signal MEM. The signal OUT generally comprises a still image (e.g., JPEG) and/or a sequence of images (or pictures). The signal VIDEO generally comprises a video signal (e.g., ITU-R BT.601, ITU-R BT.709, ITU-R BT.656-4, H.264/AVC, MPEG-2 or MPEG-4). Other standard and/or proprietary still picture and/or video compression standards may be implemented to meet the criteria of a particular application.

The circuit 104 generally comprises two or more circuits (or modules) 111a-111n. Each of the circuits 111a-111n may be configured to perform one or more operations on the images to achieve final images in the signals OUT and VIDEO. Processing of the images may include, but is not limited to, decimation filtering, interpolation, formatting, color space conversions, color corrections, tone corrections, gain corrections, offset corrections, black level calibrations, white balancing, image sharpening, image smoothing, and the like. In some embodiments, the processing may be implemented in whole or in part by software running in the circuits 111a-111n. In some embodiments, the circuit 102 and the circuit 104 may be fabricated in (on) separate dies. In other embodiments, the circuit 102 and the circuit 104 may be fabricated in (on) the same die. Additional details of the circuit 104 may be found in U.S. Pat. No. 7,536,487, hereby incorporated by reference in its entirety.

The circuit 106 may implement a buffer memory. The circuit 106 is generally operational to temporarily store image data (e.g., luminance and chrominance) for the circuit 104. In some embodiments, the circuit 106 may be fabricated as one or more dies separate from the circuit 104 fabrication. In other embodiments, the circuit 106 may be fabricated in (on) the same die as the circuit 104. The circuit 106 may implement a double data rate (DDR) synchronous dynamic random access memory (SDRAM). Other memory technologies may be implemented to meet the criteria of a particular application.

The circuit 107 may implement a connector. The circuit 107 is generally configured to allow the apparatus 100 to be connected to a television or computer monitor. Formats for the circuit 107 may include, but are not limited to, a component interface, s-video interface, a High-Definition Multimedia Interface (HDMI) interface and the like.

The circuit 108 may implement a medium. The medium 108 generally comprises one or more nonvolatile memory devices capable of storing the signal OUT. In some embodiments, the recording medium 108 may comprise a single memory medium. For example, the recording medium 108 may be implemented as a FLASH memory or a micro hard disk drive (also known as a "1-inch" hard drive). The memory may be sized (e.g., 4 gigabyte FLASH, 12 gigabyte hard disk drive). In some embodiments, the recording medium 108 may be implemented as multiple media. For example, (i) a FLASH memory may be implemented and (ii) a tape medium or an optical medium may be implemented for recording the signal OUT. Other types of media may be implemented to meet the criteria of a particular application.

The circuit 110 may implement a user input circuit. The circuit 110 may be operational to generate the signal CMD based on commands received from a user. The commands received may include, but are not limited to, a take still picture command, a start recording command, a stop recording command, a zoom in command and a zoom out command. In some embodiments, the signal CMD may comprise multiple discrete signals (e.g., one signal for each switch implemented in the user input circuit 110). In other embodiments, the signal CMD may carry the user entered commands in a multiplexed fashion as one or a few signals.

The circuit 102 generally comprises a sensor array 112 and a circuit (or module) 114. The array 112 may be operational to convert the optical images into a series of values in an analog signal (e.g., A). The values conveyed in the signal A may be analog voltages representing an intensity value at a predetermined color for each individual sensor element of the circuit 112. The circuit 112 may include an electronic cropping (or windowing) capability. The electronic cropping capability may be operational to limit readout of image elements in a window (or an active area) of the circuit 112. The circuit 114 may be operational to process and then convert the analog signal A to generate the digital signal D. The circuits 112 and 114 may be implemented in hardware, software, firmware or any combination thereof.

Processing of the electronic images in the circuit 114 may include, but is not limited to, analog gain for color corrections and analog offset adjustments for black level calibrations. The conversion generally comprises an analog to digital conversion (e.g., 10-bit). An example implementation of the circuit 102 may be an MT9T001 3-megapixel digital image sensor available from Micron Technology, Inc., Bosie, Id. Larger or smaller circuits 102 may be implemented to meet the criteria of a particular application.

Figure 5:
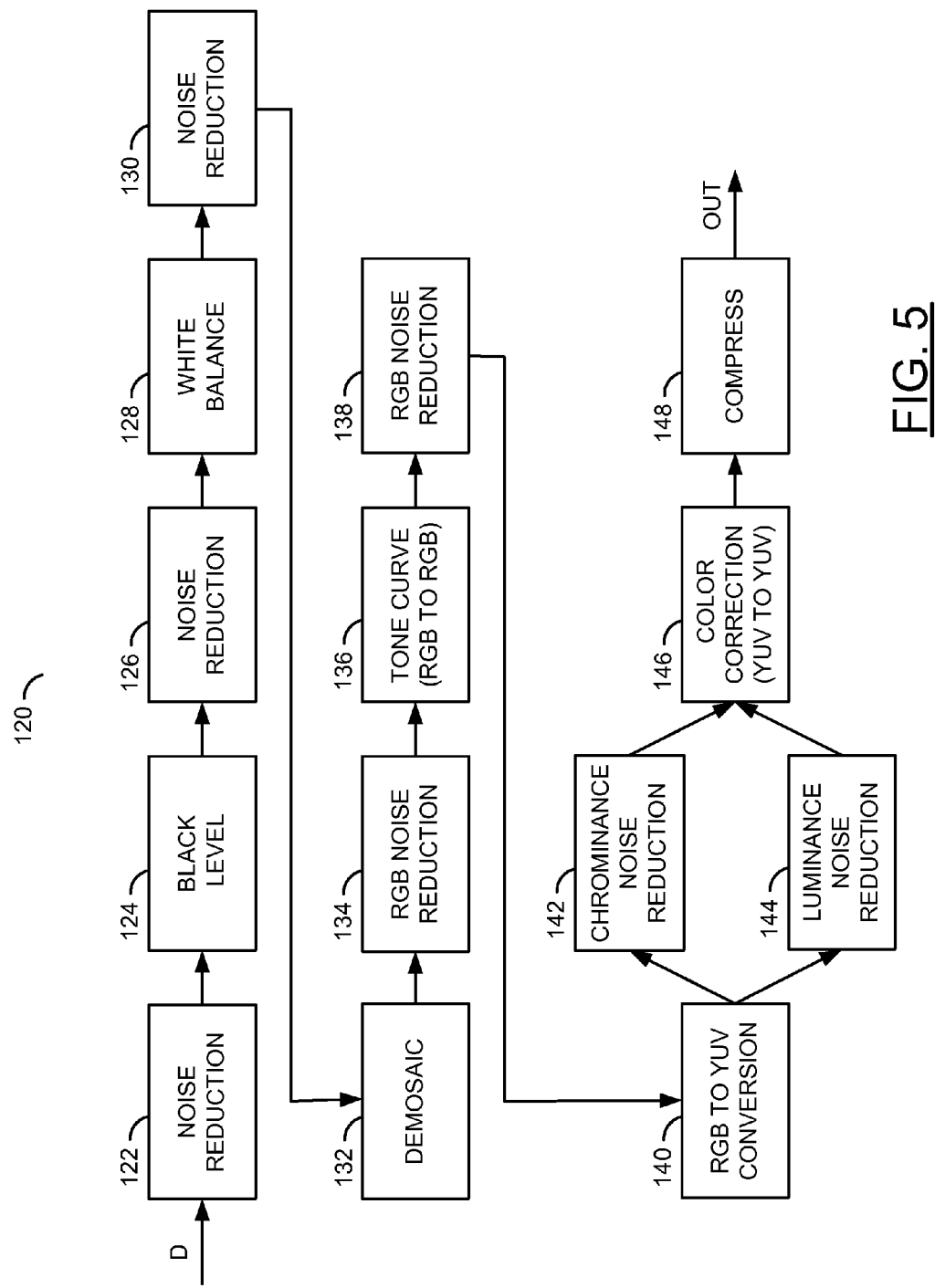
FIG. 5 is a functional block diagram of an example image processing method.

Referring to FIG. 5, a functional block diagram of an example image processing method 120 is shown. The method (or process) 120 may be generally implemented by the apparatus 100, and in particular, by the circuit 104. The method 120 generally comprises an optional step (or block) 122, a step (or block) 124, an optional step (or block) 126, a step (or block) 128, an optional step (or block) 130, a step (or block) 132, an optional step (or block) 134, a step (or block) 136, an optional step (or block) 138, a step (or block) 140, a step (or block) 142, a step (or block) 144, a step (or block) 146 and a step (or block) 148.

The method 120 generally includes processing of the digital images up to an including luminance and chrominance separation and a noise reduction. Color correction may be performed after the luminance and chrominance separation. By performing the noise reduction on the luminance data and the chrominance data early after luminance and chrominance separation, the noise-increasing color correction generally has a smaller impact. Therefore, the luminance and chrominance noise reduction may be more effective, resulting in a higher quality final image.

In the step 122, an initial noise reduction (filter) may be performed on the digital images received by the circuit 104 via the signal D. The circuit 104 may perform additional processing of the images by performing a black level correction in the step 124, another noise reduction in the step 126, a white balance correction in the step 128 and a noise reduction in the step 130. In the step 132, the digital images may be demosaiced to convert the picture information from a Bayer domain to a red-green-blue (RGB) domain. An RGB noise reduction may be performed in the step 134. A tone curve correction of the RBG images may be performed in the step 136 by the circuit 104. Another RGB noise reduction may be performed in the step 138. In some embodiments, some to all of the noise reduction steps 122, 126, 130, 134 and 138 may be eliminated from the method 120.

The circuit 104 may convert the RBG images into a YUV (e.g., luminance and chrominance) color space in the step 140. Both chrominance components (e.g., U and V) of the image may be subject to chrominance noise reduction by the circuit 104 (e.g., circuit 111a) in the step 142. The luminance components (e.g., Y) of the image may undergo luminance noise reduction in the circuit 104 (e.g., circuit 111b) in the step 144. Generally, the step 142 filters the chrominance components more heavily than the step 144 filters the luminance components. Other luminance and chrominance noise reduction techniques may be implemented to meet the criteria of a particular application.

In the step 146, the circuit 104 (e.g., circuit 111c) may perform a YUV to YUV color correction on the filtered images. Since the step 146 occurs after the luminance and chrominance noise reductions steps 142 and 144, the color correction step 146 may induce less color-based noise than common techniques. Steps 142 and 144 may be performed either in parallel by different circuits 111a-111n or sequentially by one or more of the circuits 111a-111n. After the color space conversion, the circuit 104 may compress the images in the step 148 for subsequent storage in the circuit 108. Temporary storage of full and/or partial images and associated data may utilize the circuit 106.

Figure 6:
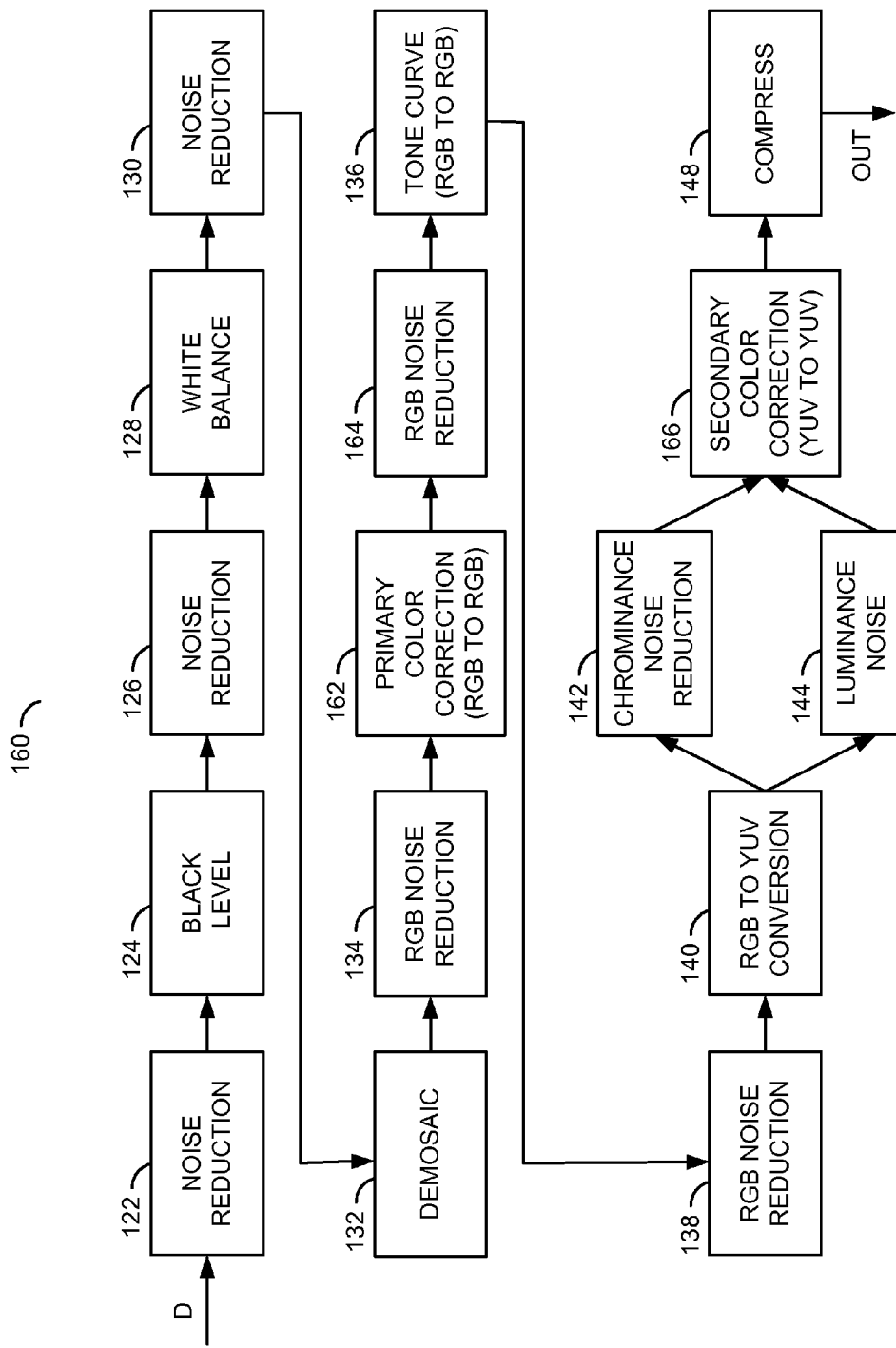
FIG. 6 is a functional block diagram of an example image processing method in accordance with a preferred embodiment of the present invention.

Referring to FIG. 6, a functional block diagram of an example image processing method 160 is shown in accordance with a preferred embodiment of the present invention. The method (or process) 160 may be generally implemented by the apparatus 100, and in particular, by the circuit 104. The method 100 generally comprises the step 122, the step 124, the step 126, the step 128, the step 130, the step 132, the step 134, the step 136, the step 138, the step 140, the step 142, the step 144, the step 148, a step (or block) 162, an optional step (or block) 164 and a step (or block) 166.

The method 160 may be similar to the method 120 with a primary color correction (e.g., step 162) performed by the circuit 104 before the luminance and chrominance separation (e.g., step 138). An optional RGB noise reduction may be performed in the step 164 between the primary color correction and the tone curve correction. A secondary color correction (e.g., step 166) is generally performed by the circuit 104 after the luminance and chrominance separation. In some embodiments, the step 166 may perform the same color correction as the step 146. In other embodiments, the step 166 may perform a different color correction than the step 146 to account for the changes already made by the primary color correction. The method 160 may be useful where noise addition (in the circuit 102) and noise reduction (in the circuit 104) change the final color, compared with a case of low noise sensing and subsequent low noise reduction. The secondary color correction generally restores more accurate colors to the final images.

Figure 7:
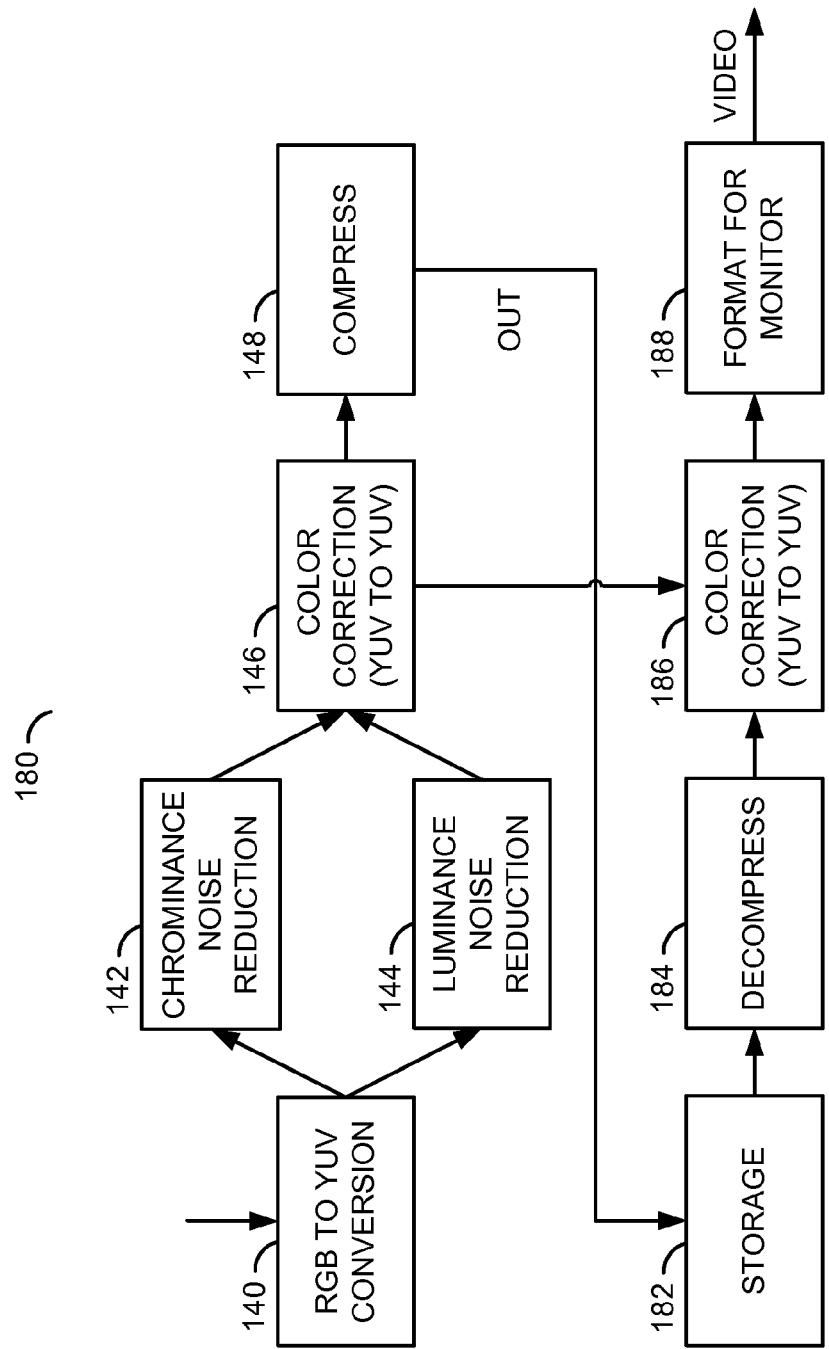
FIG. 7 is a functional block diagram of another example image processing method.

Referring to FIG. 7, a functional block diagram of an example image processing method 180 is shown. The method (or process) 180 may be generally implemented by the apparatus 100. The method 100 generally comprises the steps 122 to 138 (not shown), the step 140, the step 142, the step 144, the step 148, a step (or block) 182, an optional step (or block) 184, a step (or block) 186 and a step (or block) 188.

The method 180 may be similar to the methods 120 and/or 160, and generally continues after the compression step. While the apparatus 100 is operating in a recording mode, the compressed images may be written by the circuit 104 into the circuit 108 in the step 182. While operating in a playback mode, the circuit 104 may read the compressed images from the circuit 108 in the step 184. In the step 186, the compressed images may be decompressed by the circuit 104. A YUV to YUV lookup color correction may be performed in the step 188 to establish video corrected colors. The step 188 processing generally converts the images into one or more formats suitable to present to a monitor via the signal VIDEO. While the apparatus 100 is operating in a viewing mode, the circuit 104 may route the color corrected images created by the step 146 to the step 186 so that a user of the apparatus 100 may see what the camera sees without consuming storage space in the circuit 108.

In some embodiments, the YUV to YUV color correction steps 146, 166 and/or 186 may implement a lookup-table based correction method. The lookup-table based correction method is generally described in co-pending U.S. application Ser. No. 12/706,816 and Ser. No. 12/712,307, both of which are incorporated by reference in their entirety.

The functions performed by the diagrams of FIGS. 4-7 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products) or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
a circuit configured to (i) convert a digital image from a red-green-blue representation to a luminance-and-chrominance representation, (ii) generate a reduced noise representation of said digital image by reducing noise in said luminance-and-chrominance representation, (iii) generate a color corrected representation of said digital image in said luminance-and-chrominance representation by first color correcting said reduced noise representation, wherein said first color correcting maps said reduced noise representation from a first color space to a second color space in three dimensions, and (iv) generate another color corrected representation of said digital image in said luminance-and-chrominance representation by second color correcting said color corrected representation as read from a memory.

2. The apparatus according to claim 1, wherein said first color correcting of said reduced noise representation is an initial color correction of said digital image after being received from an electro-optical sensor.

3. The apparatus according to claim 1, wherein said circuit is further configured to convert said digital image from a Bayer color filter array representation to said red-green-blue representation.

4. The apparatus according to claim 1, wherein said circuit is further configured to second color correct said digital image prior to said reducing of said noise in said luminance-and-chrominance representation.

5. The apparatus according to claim 1, wherein said circuit is further configured to compress said color corrected representation of said digital image.

6. The apparatus according to claim 1, wherein said circuit is further configured to (i) noise filter a luminance component of said luminance-and-chrominance representation of said digital image by a first method and (ii) noise filter a chrominance component of said luminance-and-chrominance representation of said digital image by a second method, wherein said second method is a heavier filtering than said first method.

7. The apparatus according to claim 1, wherein said circuit is further configured to store said digital image in a memory after said first color correcting.

8. The apparatus according to claim 1, wherein said apparatus forms a digital camera.

9. The apparatus according to claim 1, wherein said luminance-and-chrominance representation of said digital image comprises a YUV color representation of said digital image.

10. A method for reducing noise in a digital image, comprising the steps of:
(A) converting said digital image from a red-green-blue representation to a luminance-and-chrominance representation using a circuit;

(B) generating a reduced noise representation of said digital image by reducing noise in said luminance-and-chrominance representation;

(C) generating a color corrected representation of said digital image in said luminance-and-chrominance representation by first color correcting said reduced noise representation, wherein said first color correcting maps said reduced noise representation from a first color space to a second color space in three dimensions; and (D) generating another color corrected representation of said digital image said luminance-and-chrominance representation by second color correcting said color corrected representation as read from a memory.

11. The method according to claim 10, wherein said first color correcting of said reduced noise representation is an initial color correction of said digital image after being received from an electro-optical sensor.

12. The method according to claim 10, further comprising the step of:
converting said digital image from a Bayer color filter array representation to said red-green-blue representation using said circuit.

13. The method according to claim 10, further comprising the step of:
second color correcting said digital image prior to said reducing of said noise in said luminance-and-chrominance representation.

14. The method according to claim 10, further comprising the step of:
generating a compressed representation of said digital image by compressing said color corrected representation of said digital image.

15. The method according to claim 10, further comprising the steps of:
noise filtering a luminance component of said luminance-and-chrominance representation of said digital image by a first method; and
noise filtering a chrominance component of said luminance-and-chrominance representation of said digital image by a second method, wherein said second method is a heavier filtering than said first method.

16. The method according to claim 10, further comprising the step of:
storing said digital image in a memory after step (C).

17. The method according to claim 10, wherein said method is performed in a digital camera.

18. An apparatus comprising:
means for converting a digital image from a red-green-blue representation to a luminance-and-chrominance representation;
means for generating a reduced noise representation of said digital image by reducing noise in said luminance-and-chrominance representation;
means for generating a color corrected representation of said digital image in said luminance-and-chrominance representation by first color correcting said reduced noise representation, wherein said first color correcting maps said reduced noise representation from a first color space to a second color space in three dimensions; and
means for generating another color corrected representation of said digital image said luminance-and-chrominance representation by second color correcting said color corrected representation as read from a memory.

* * * * *